(12) United States Patent
Chu (10) Patent No.: US 9,295,306 B2
(45) Date of Patent: Mar. 29, 2016

(54) CORD LOCK

(75) Inventor: Yuen Fu Sparkle Chu, Hong Kong (CN)

(73) Assignee: Duraflex Hong Kong Limited, Hong Kong (CN)

( * ) Notice: Subject to any disclaimer, the term of this patent is extended or adjusted under 35 U.S.C. 154(b) by 202 days.

(21) Appl. No.: 14/125,493

(22) PCT Filed: Jun. 5, 2012

(86) PCT No.: PCT/CN2012/076490
§ 371 (c)(1),
(2), (4) Date: Dec. 11, 2013

(87) PCT Pub. No.: WO2013/004117
PCT Pub. Date: Jan. 10, 2013

(65) Prior Publication Data
US 2014/0101898 A1    Apr. 17, 2014

(30) Foreign Application Priority Data

Jul. 1, 2011   (CN) .................. 2011 2 0231225 U (51) Int. Cl.
| | |
|---|---|
| A44B 11/04 | (2006.01) |
| A44B 11/06 | (2006.01) |
| F16G 11/04 | (2006.01) |
| A41F 1/00 | (2006.01) |

(52) U.S. Cl.
CPC .............. *A44B 11/06* (2013.01); *F16G 11/046* (2013.01); *A41F 1/00* (2013.01); *Y10T 24/398* (2015.01)

(58) Field of Classification Search
None
See application file for complete search history.

(56) References Cited

U.S. PATENT DOCUMENTS

| | | | | |
|---|---|---|---|---|
| 4,373,463 A | * | 2/1983 | Beaudette | ............... B63B 21/08 |
| | | | | 114/218 |
| 5,987,710 A | * | 11/1999 | Paul | ....................... A01K 69/00 |
| | | | | 24/130 |
| 2012/0159752 A1 | | 6/2012 | Kawaguchi | |

FOREIGN PATENT DOCUMENTS

| | | |
|---|---|---|
| CN | 1260152 A | 7/2000 |
| CN | 1359649 A | 7/2002 |
| CN | 101594799 A | 12/2009 |
| CN | 202125566 U | 1/2012 |

(Continued)

OTHER PUBLICATIONS

International Search Report of PCT/CN2012/076490, mailed Sep. 6, 2012.

(Continued)

*Primary Examiner* — Jack W Lavinder
(74) *Attorney, Agent, or Firm* — Collard & Roe, P.C.

(57) ABSTRACT

A cord lock comprises a basic portion, and a first hook portion and a second hook portion integrated with the basic portion. The first hook portion and the second hook portion are formed at a first side of the basic portion. The first hook portion has a first concave portion for securing a cord. The second hook portion has a second concave portion for securing the cord. The opening direction of the first concave portion is different from that of the second concave portion. The first concave portion and the second concave portion bend the cord between the first hook portion and the second hook portion so as to secure the cord. The cord lock can be assembled on a cord at any time without having to be assembled on a product in advance and can be removed at any time, thereby making the production arrangement more flexible.

8 Claims, 8 Drawing Sheets

(56) References Cited

FOREIGN PATENT DOCUMENTS

| | | |
|---|---|---|
| JP | 2005-206969 A | 8/2005 |
| WO | 2011007715 A1 | 1/2011 |

OTHER PUBLICATIONS

English translation of the Written Opinion of the International Searching Authority of PCT/CN2012/076490.

* cited by examiner

CORD LOCK

CROSS REFERENCE TO RELATED APPLICATIONS

This application is the National Stage of PCT/CN2012/076490 filed on Jun. 5, 2012, which claims priority under 35 U.S.C. §119 of Chinese Application No. 201120231225.X filed on Jul. 1, 2011, the disclosures of which are incorporated by reference. The international application under PCT article 21(2) was not published in English.

FIELD OF TECHNOLOGY

This new utility model involves a cord lock to be used on ready-to-wear clothing, backpacks, bags, tents, and shoes and used for locking or adjusting cords.

BACKGROUND TECHNOLOGY

Cord locks are often used on items such as ready-to-wear clothing, backpacks, bags, tents, and shoes and used for locking or adjusting cords. These cord locks can be roughly separated into two kinds. One kind is hard rubber cord locks, which are normally formed by two or more elements. For example, a kind of commonly seen cord lock is composed of three elements, including a pressing core, outer shell, and a spring. The spring is packed onto the pressing core, and then the packaged pressing core and springs are set into the outer shell. The locking and releasing of the cord lock is realized by pressing or releasing the inner core. This type of cord lock has a complex structure, multiple production steps, time intensive packaging, and high cost. Another type of cord lock only includes the two pressing core and outer shell elements. The pressing core is inserted into the outer shell, and the locking and releasing of the cord lock is realized by pressing or releasing the inner core. Although it is relatively simpler than the cord lock with three elements, it still is not superior in regard to the packaging process and cost. Other than the hard rubber cord lock, there is still another kind that is a soft rubber cord lock, and it can be made to only include one part. However, this kind of cord lock is limited by the insufficient durability of its own material. The force used to clamp the cord can be influenced by both [using the cord lock for] an extended period of time and the weather, easily resulting in a degraded ability to clamp the cord.

Invention Contents

The technical problems resolved by this new utility model consist of those regarding the aforementioned shortcomings of currently available cord lock technology. The cord lock offered here is a unified whole, reduces the packaging process, and reduces cost. In addition, it is able to maintain a good ability to clamp the cord.

The technical plans adopted by this new utility model to resolve its technical problems are: make a cord lock where said cord lock includes a foundation element, and a first cord hook element and a second cord hook element form an integrated whole with this foundation element. The said first cord hook element and second cord hook element form the first side of this foundation element. The said first cord hook element possesses the first concave element used for cord locking. The said second cord hook element possesses the second concave element used for cord locking. The direction of the opening of the first concave element and the second concave element are not the same. The said first concave element and the second concave element make the cord bend between the first cord hook element and the second cord hook element, thereby locking the cord.

Within this new utility model's aforementioned cord lock, the first side of the said foundation element possesses a pair of the said first cord hook elements. The said second cord hook element is located between the pair of the first cord hook elements. The gap between the said second cord hook element and the first cord hook element is smaller than the diameter of the cord. The difference in height between the position of the trough of the said first concave element and the position of the trough of the said second concave element is smaller than the diameter of the cord.

Within this new utility model's aforementioned cord lock, the end segment of the said second cord hook element gradually narrows. The said end segment forms a triangle or a semicircle.

Within this new utility model's aforementioned cord lock, the end segment of the first cord hook element is oriented at a right angle to the position of the second cord hook element.

Within this new utility model's aforementioned cord lock, the said first concave element takes the shape of an inverted U. The said second concave element is a U shape. The width of the said first concave element and the width of the said second concave element are smaller than the diameter of the cord.

Within this new utility model's aforementioned cord lock, the second side of the said foundation element possesses a hole for a woven belt provided for threading a woven belt through it.

Within this new utility model's aforementioned cord lock, the second side of the said foundation element possesses the plate-shaped sewing tablet that is extended out of the foundation element.

Within this new utility model's aforementioned cord lock, the second side of the said base element is formed by the paired of the first cord hook element and one second cord hook element. The said second side's paired cord hook elements and one second cord hook element are symmetrical or not symmetrical with the said first side's pair of the first cord hook element and one second cord hook element.

Within this new utility model's aforementioned cord lock, the said foundation element is equipped with holes for a woven belt.

Within this new utility model's aforementioned cord lock, the said cord lock is in the shape of a cylinder, and the two ends of the said cord lock are rounded.

This new utility model's cord lock has the following beneficial effects: this new utility model's foundation element as well as the first cord hook element and second cord hook element form an integrated whole, and no assembling work is required, notably reducing the cost. In addition, this cord lock can be packaged onto a cord at any time, and it does not necessarily need to be prepackaged onto finished goods. Even more so, it can be removed at any time, resulting in even more agile production planning. This cord lock does not need to be pressed. Directly pull on the cord lock or pull on the cord to immediately adjust the cord length. It is extremely convenient to use.

DESCRIPTION OF ATTACHED FIGURES

Integrated figures and implementation examples are below, serving to further advance the description of this new utility model. The attached images include.

SPECIFIC IMPLEMENTATION MODES

For an even clearer understanding of the technical characteristics, purpose, and effects of this new utility model, first compare the specific implementation modes of the detailed descriptions of the attached figures in this new utility model.

As displayed in FIG. 1 through FIG. 12, in the first implementation example of the cord lock for this new utility model, the cord lock in this implementation example is a miniature cord lock with a comparatively smaller surface area. As displayed in the figure, this cord lock is an integrated whole. It includes a foundation element 1 as well as a coupled first cord hook element 2 and a second cord hook element 3 that form an integrated whole with this foundation element 1, and the first cord hook element 2 and second cord hook element 3 form the first side of this foundation element 1. The foundation element 1 extends along in the direction of the cord 5 being adjusted by the cord lock. The first cord hook element 2 and the second cord hook element 3 extend outwardly along the first side of the foundation element 1 in the direction perpendicular to the foundation element 1. The second cord hook element 3 is located between the two first cord hook elements 2. The gap 41 between the second cord hook element 3 and the first cord hook element 2 is smaller than the diameter of the cord 5. The first cord hook element 2 possesses the first concave element 21 used for cord locking. The second cord hook element 3 possesses the second concave element 31 used for cord locking. The direction of the opening of the first concave element 21 and the second concave element 31 are not the same and can be oriented in the opposite direction or in a direction oblique to the opening. Specifically for this implementation example, the first concave element 21 is in the shape of an inverted U. The second concave element 31 is a U shape. The position of the trough 211 of the first concave element 21 is higher than the position of the trough 311 of the second concave element 31. In addition, the difference in height h between the position of the trough 211 of the first concave element 21 and the position of the trough 311 of the second concave element 31 is smaller than the diameter of the cord 5. The location of the trough 211 of the first concave element 21 is also the position of the highest point of the first concave element 21 of the inverted U shape. The position of the trough 311 of the second concave element 31 is also the position of the lowest point of the second concave element 31 of the U shape. In addition, the difference in height h between the position of the trough 211 and the position of the trough 311 is described in the schematic. As a result of the gap between the first cord hook element 2 and the second cord hook element 3 being smaller than the diameter of the cord and the difference in height between the position of the trough 211 of the first concave element 21 and the position of the trough 311 of the second concave element 31 being smaller than the diameter of the cord 5, the second cord hook element 3 causes the cord 5 that is threaded through the first concave section 21 of the first cord hook element 2 to develop an upward shift which then causes the cord 5 to bend 51 between the first cord hook element 2 and the second cord hook element 3. Thus, when pulling on the cord in the direction of the cord 5, the force of friction between the cord 5 and the first cord hook 2 and second cord hook 3 elements increases as a result of the existence of the bend 51. This results in the cord 5 being able to remain in the preset position. What must be understood is that the shape of the first concave element 21 and the second concave element 31 are not restricted to a U shape. Any other applicable shape that can also fasten the cord is suitable.

The cord lock of this new utility model does not need to be prepackaged together with the cord 5. When placing the cord lock onto a cord 5, one end of the cord can first wedge into the gap 41 between one first cord hook element 2 and second cord hook element 3. Continuing on, wedge the other end of the cord 5 in the gap 41 between one first cord hook element 2 and second cord hook element 3. Afterwards, pull on the two ends of the cord 5, making the cord enter into the inside of the first trough element 21 of the first cord hook element 2 and the second trough element 31 of the second cord hook element 3. For ease of operability, the end segment 32 of the second cord hook element 3 can be set to gradually become narrower, for example, a triangle or a semicircle. In this implementation example, the end segment 32 of the second cord hook element 3 is a triangle which serves as a guide for the cord 5 during assembling and making it easier to mount the cord lock on the cord 5.

In this implementation example, in order to prevent the cord 5 getting loose from the cord lock, the end segment 22 of the first cord hook element 2 that is oriented toward the position of the second cord hook element 3 can be set as a right angle 23. Taking it one step further, the width w of the first concave element 21 of the first cord hook element 2 as well as the width w of the second concave element 31 of the second cord hook element 3 can be made to be smaller than the diameter d of the cord 5, resulting in the first concave element 21 and the second concave element 31 having their own certain clamping effect on the cord 5. This makes it even better for preventing the cord 5 from getting loose from the cord lock.

When the cord 5 must be adjusted, the two ends of the cord 5 just need to be pulled on to stretch the cord 5 which causes the diameter of the cord 5 to become smaller. Afterwards, shift the cord lock to the required position and then release the cord 5 for it to become fastened in position.

The cord lock in this implementation example is essentially in the shape of a cylinder, and the two ends of the cord lock are rounded. The outer shape is small and exquisite and can be stored inside clothing.

Figure 1:
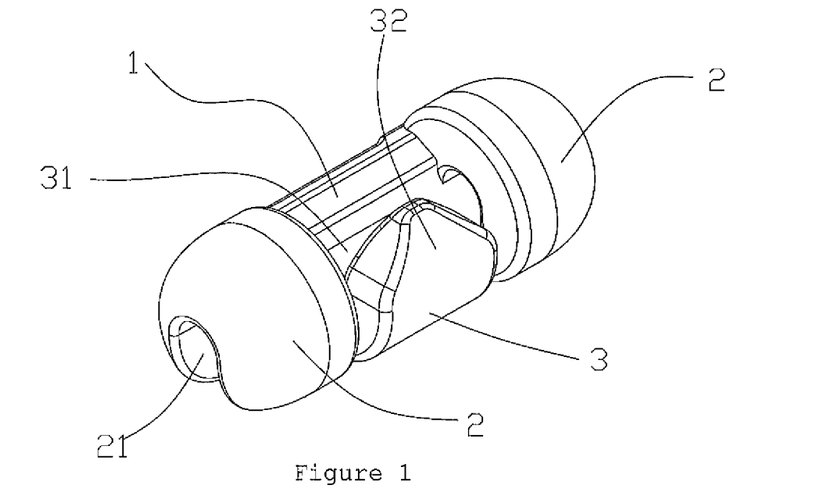
FIG. 1 is this new utility model's first three-dimensional schematic diagram of the first implementation example of the cord lock.
Figure 2:
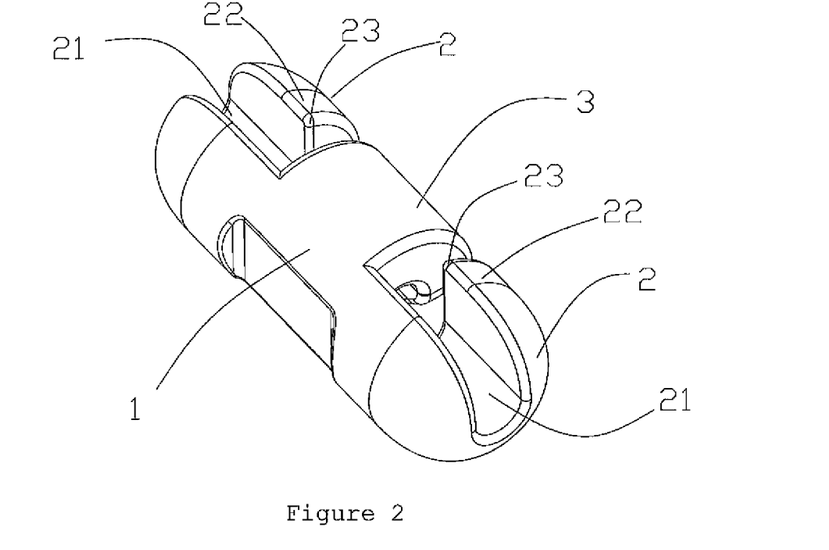
FIG. 2 is this new utility model's second three-dimensional schematic diagram of the first implementation example of the cord lock.
Figure 3:
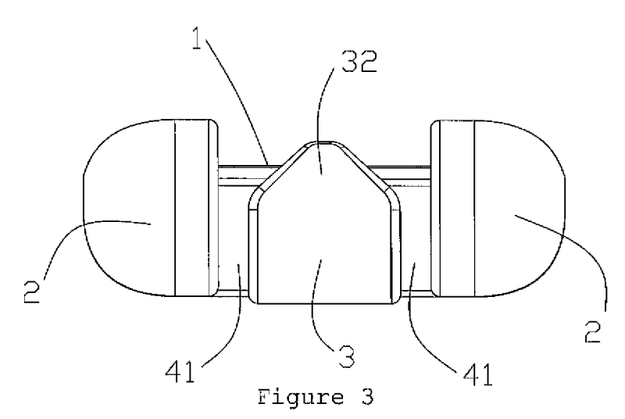
FIG. 3 is this new utility model's front view of the first implementation example of the cord lock.
Figure 4:
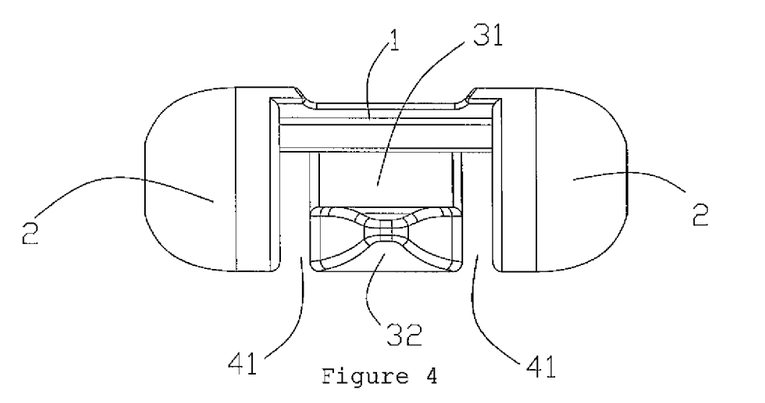
FIG. 4 is this new utility model's top view of the first implementation example of the cord lock.
Figure 5:
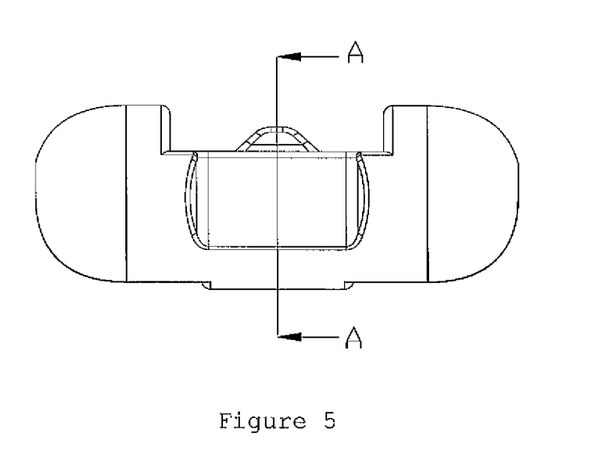
FIG. 5 is this new utility model's rear view of the first implementation example of the cord lock.
Figure 6:
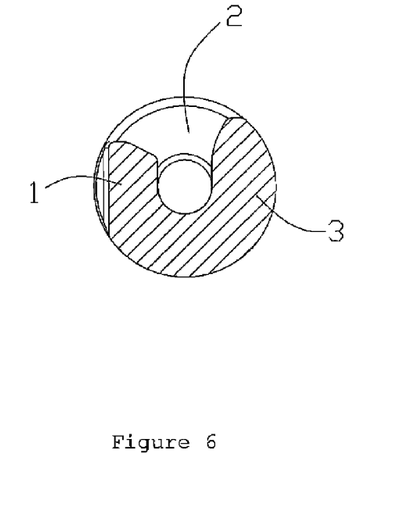
FIG. 6 is the A-A cross-section in FIG. 5.
Figure 7:
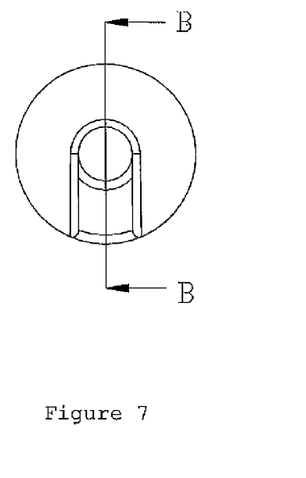
FIG. 7 is this new utility model's left view of the first implementation example of the cord lock.
Figure 8:
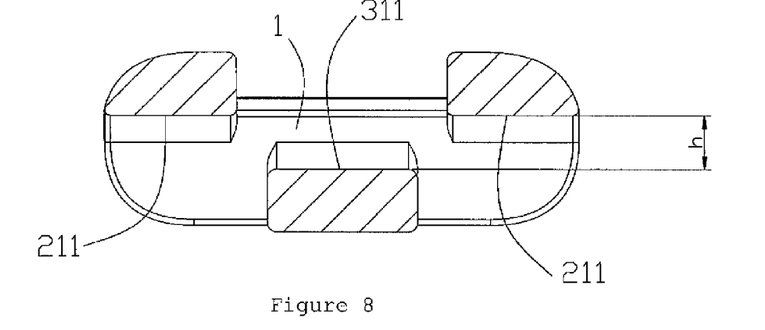
FIG. 8 is the B-B cross-section in FIG. 7.
Figure 9:
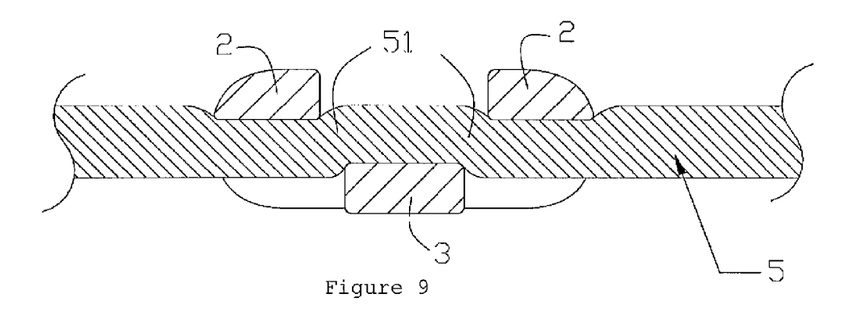
FIG. 9 is this new utility model's first schematic diagram of the first implementation example the cord lock combined with a cord.
Figure 10:
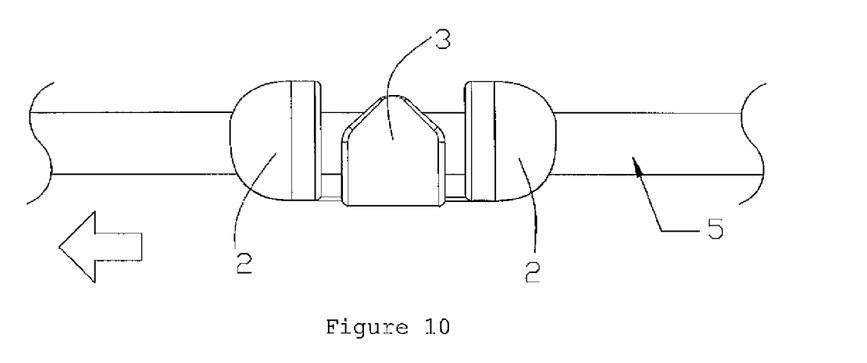
FIG. 10 is this new utility model's schematic diagram for adjusting the cord in the first implementation example of the cord lock.
Figure 11:
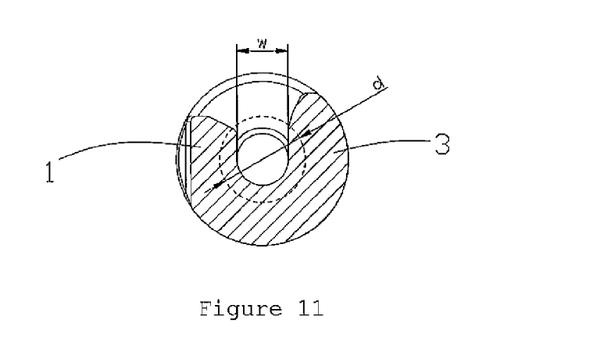
FIG. 11 is this new utility model's second schematic diagram of the first implementation example of the cord lock combined with a cord.
Figure 12:
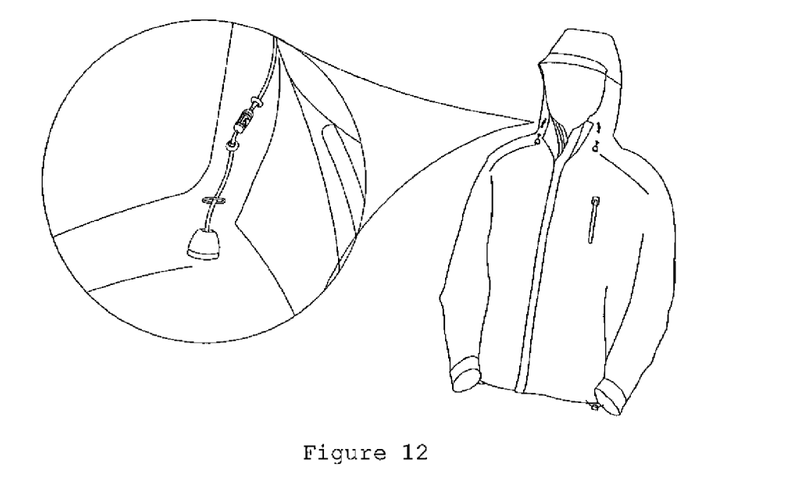
FIG. 12 is this new utility model's schematic diagram for the first implementation example of the cord lock used on clothing.

FIG. 12 displays a schematic of the cord lock in this implementation example used on clothing.

Figure 13:
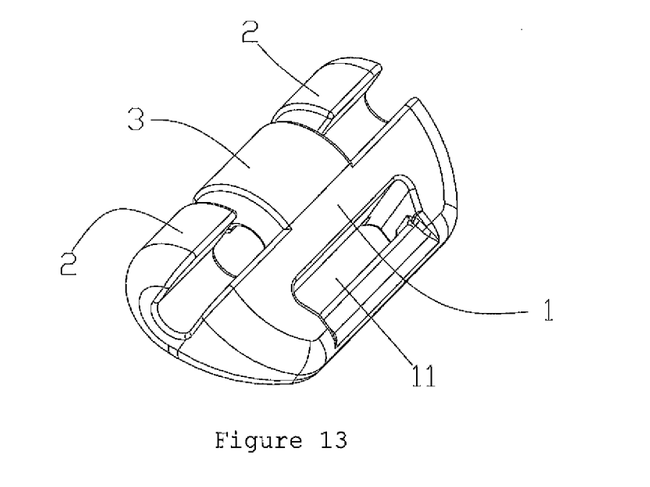
FIG. 13 is this new utility model's first three-dimensional schematic diagram for the second implementation example of the cord lock.
Figure 14:
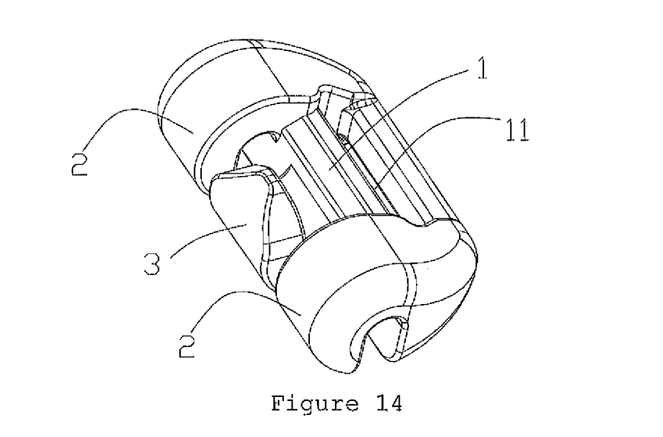
FIG. 14 is this new utility model's second three-dimensional schematic diagram for the second implementation example of the cord lock.
Figure 15:
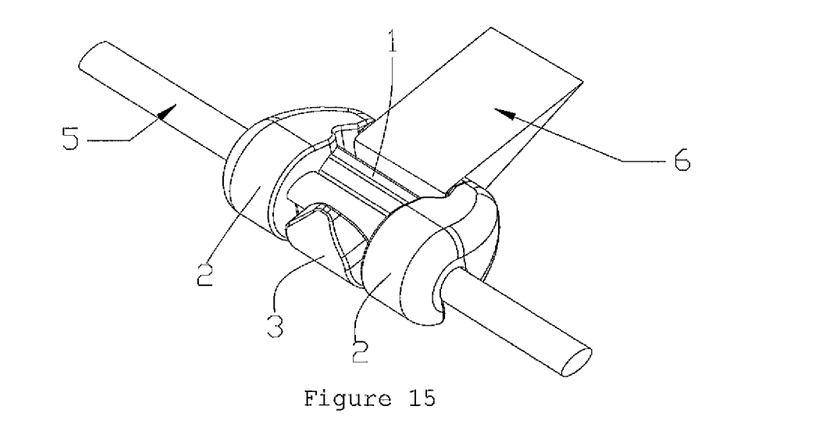
FIG. 15 is this new utility model's schematic diagram of the state of use for the second implementation example of the cord lock.

As displayed in FIG. 13 through FIG. 15, as for the second implementation example of this cord lock in this new utility model, this implementation example makes an additional improvement upon the foundation of the first implementation example. Specifically, a hole for a woven belt 11 provided for threading a woven belt 6 through it is formed on the second side of the foundation element 1. The cord lock can be worn on a woven belt 6 via this woven belt hole 11. FIG. 15 provides a schematic of this cord lock worn on a woven belt 6. The other compositions of this cord lock in this implementation example are the same as the composition of the cord lock in the first implementation example. Repetitious details will not be provided.

Figure 16:
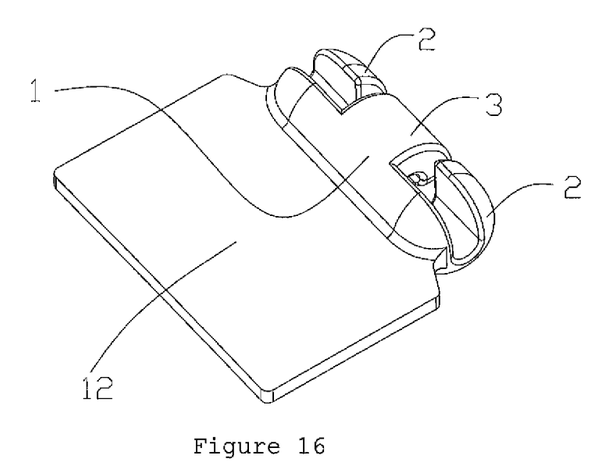
FIG. 16 is this new utility model's first three-dimensional schematic diagram for the third implementation example of the cord lock.
Figure 17:
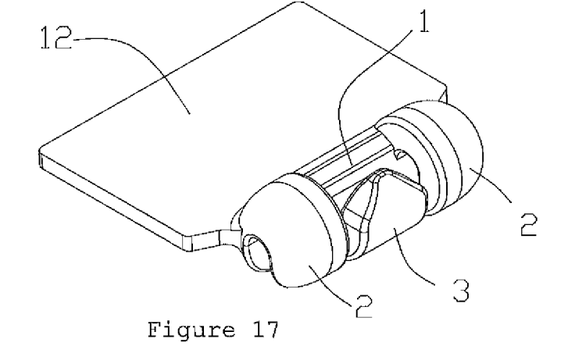
FIG. 17 is this new utility model's second three-dimensional schematic diagram for the third implementation example of the cord lock.
Figure 18:
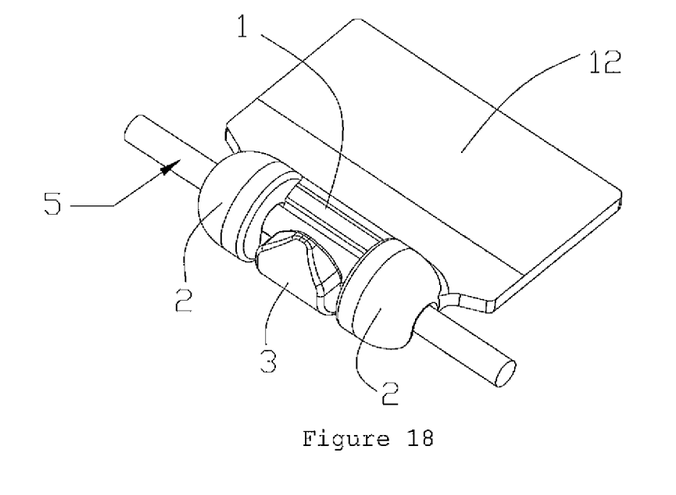
FIG. 18 is this new utility model's schematic diagram of the state of use for the third implementation example of the cord lock.
Figure 19:
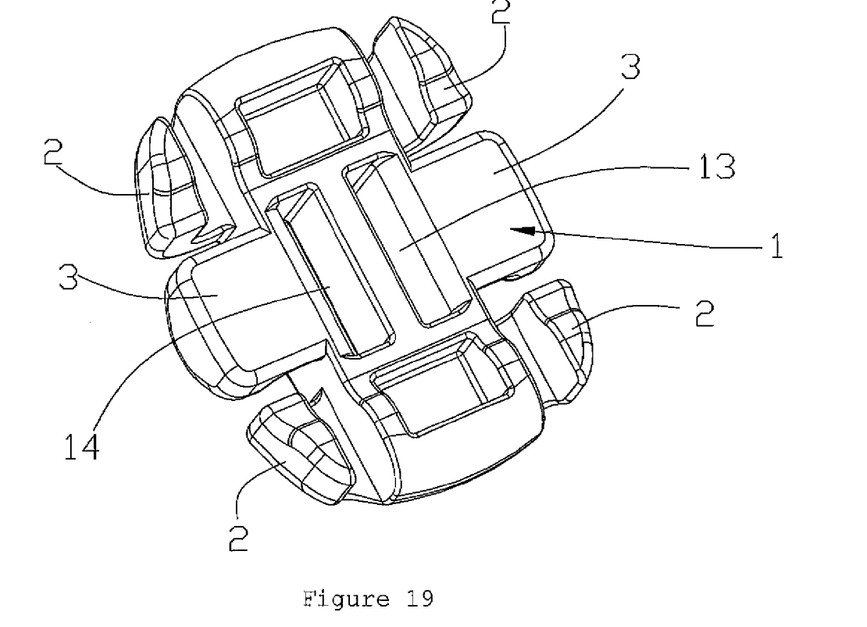
FIG. 19 is this new utility model's first three-dimensional schematic diagram for the fourth implementation example of the cord lock.
Figure 20:
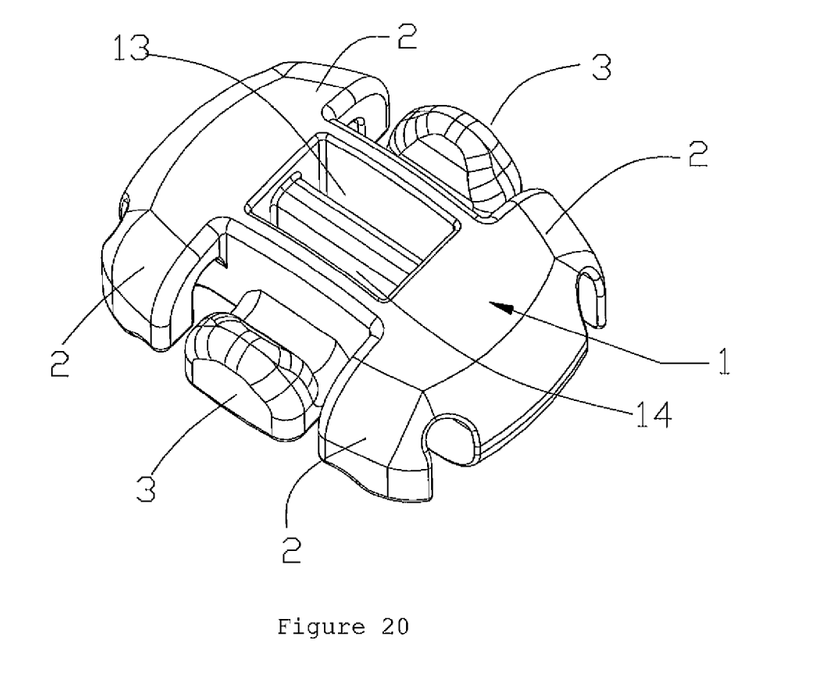
FIG. 20 is this new utility model's second three-dimensional schematic diagram for the fourth implementation example of the cord lock.
Figure 21:
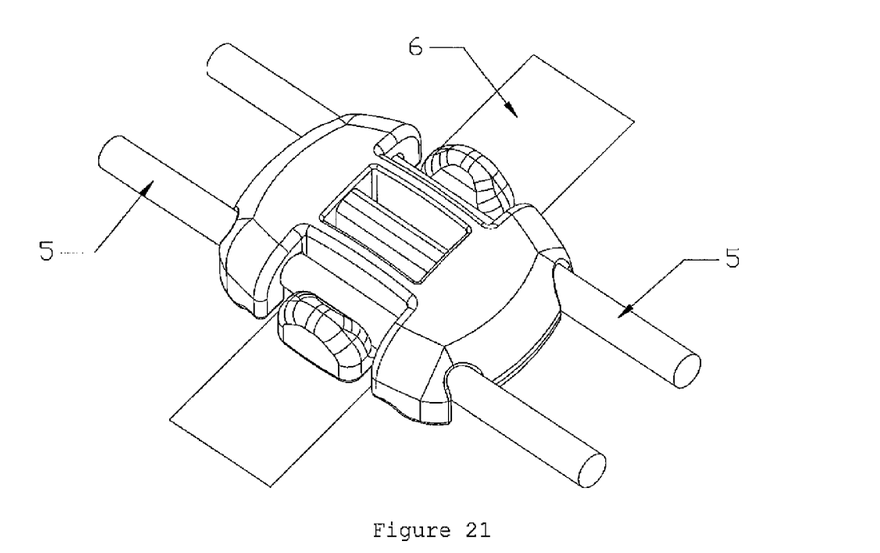
FIG. 21 is this new utility model's first schematic diagram of the state of use for the fourth implementation example of the cord lock.
Figure 22:
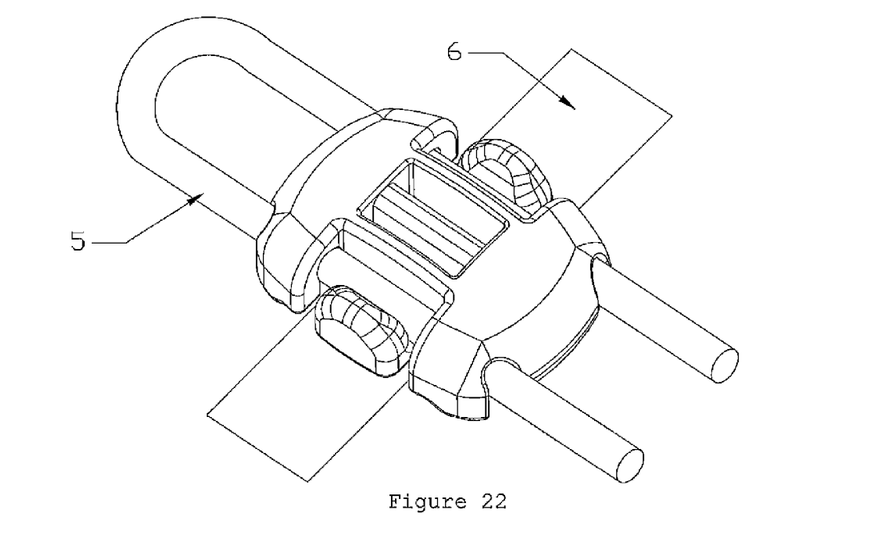
FIG. 22 is this new utility model's second schematic diagram of the state of use for the fourth implementation example of the cord lock.

As displayed in FIG. 16 through FIG. 18, as for the third implementation example of this cord lock in this new utility model, this implementation example makes an additional improvement upon the foundation of the first implementation example. Specifically, a plate-shaped sewing tablet 12 is formed on the second side of the foundation element 1. Via this sewing tablet, the cord lock can be sewn onto clothing, bags, tents, etc. so the cord lock can be used. The other compositions of this cord lock in this implementation example are the same as the composition of the cord lock in the first implementation example. Repetitious details will not be provided.

As displayed in FIG. 19 through FIG. 22, as for the fourth implementation example of this cord lock in this new utility model, the surface area of the cord lock in this implementation example is a little larger than the surface area of the cord lock in the first implementation example. Specifically, the pair of the first cord hook element 2 and second cord hook element 3 is symmetrically set for both the first side and the second side of the foundation element 1 of the cord lock. Two holes 13, 14 for a woven belt 6, provided for threading a woven belt through them, are set up on the foundation element 1, thus employing the cord lock's additional function of adjusting the woven belt. The cord lock is able to not only adjust two cords, but can also carry out double adjustments for one cord as a result of the coupled first cord hook element 2 and second cord hook element 3 being set up on the two sides of the cord lock's foundation element. This is separately shown in FIG. 21 and FIG. 22. The structure of the first cord hook element 2 and second cord hook element 3 on each side of the foundation element in this implementation and the structure of the first cord hook element 2 and second cord hook element 3 on each side of the foundation element 1 in the first implementation are the same. Repetitious details will not be provided.

What must be understood is that the several aforementioned implementation examples are the relatively preferred implementation examples. In practical applications, the first side or second side of the foundation element 1 may only extend one first cord hook element 2 and one second cord hook element 3. The directions of the openings of the two cord hook elements are not the same. As a result of the misaligned position of the two cord hook elements, a bend in the cord 5 can exist between the first cord hook element 2 and second cord hook element 3, thus realizing the ability to fasten and adjust a cord. As for the gap between the first cord hook element 2 and second cord hook element 3, it does not necessarily have to be smaller than the diameter of the cord. It can also be larger than the diameter of the cord. In addition, the concave element's 31 trough position 311 of the second cord hook element 3 can be higher than the concave element's 21 trough position 211 of the first cord hook element 2. Also as in FIG. 8, the trough position 311 of the concave element 3 of the second cord hook element 3 can slide upwards past the position of the trough point 311 of the first cord hook element 2. These above scenarios for modifying the shape are also included within the scope of protection for this new utility model.

The cord lock of this new utility model adopts the form of an integrated whole. Materials and processes are conserved as compared to the packaging for cord locks requiring two elements or more than two elements. In addition, the assembly processes can be reduced, notably reducing the cost. The cord lock of this new utility model does not need to be prepackaged onto the cord, thus the production of clothing, bags, tents, etc. does not need to wait on cord locks which provides for more agility in the planning process. As compared to cord locks that include springs, the cord lock of this new utility model has a more stable composition, a longer lifespan, and it cannot become useless due to the failure of a spring. The cord lock of this new utility model is even more stable due to using the combination of the first cord hook element and second cord hook element to fasten a cord.

The above combined attached images offer descriptions of implementation examples for this new utility model. However, this new utility model is not limited to the aforementioned specific implementation modes. The aforementioned specific implementation modes are just illustrations and are not limitations. Ordinary technical personnel within this field that are inspired by this new utility model may, under the condition that they do not depart from this new utility model's purpose and the patent claim's scope of protection, make many different styles. These, without exception, fall under protection by this new utility model.

The invention claimed is:
1. A cord lock comprising:
    a foundation element;
    two first cord hook elements integrally formed with the foundation element and each first cord hook element having a first concave element for securing a cord;
    a second cord hook element integrally formed with the foundation element, the second cord hook element being disposed on a first side of said foundation element between the two first cord hook elements, the second cord hook element having a second concave element for securing the cord, wherein an opening direction of the first concave elements is different from an opening direction of the second concave element; and a cord secured to the cord lock by pressing the cord into a gap between the first cord hook element and second cord hook element and stretching the cord, so that the cord enters the first and second concave elements, wherein releasing the cord after the cord enters the first and second concave elements causes the cord to rest in the first and second concave elements in a bent state to secure the cord to the cord lock, wherein a gap between each of the first cord hook elements and the second cord hook element is smaller than a diameter of the cord, and a difference in height between a position of a trough of the first concave elements and a position of the trough of the second concave element is smaller than the diameter of the cord.

2. The cord lock according to claim 1, wherein the second cord hook element has an end segment in the shape of a triangle or semicircle.

3. The cord lock according to claim 1, wherein each of the first concave elements is in the shape of an inverted U.

4. The cord lock according to claim 1, wherein a second side of the foundation element has a hole for receiving a woven belt.

5. The cord lock according to claim 1, wherein a second side of the foundation element has a plate-shaped sewing tablet extending out of the foundation element.

6. The cord lock according to claim 1, wherein a second side of the foundation element has an additional pair of first cord hook elements and an additional second cord hook element for securing a second cord to the cord lock.

7. The cord lock according to claim 6, wherein the foundation element is equipped with holes for accommodating a woven belt.

8. The cord lock according to claim 1, wherein the cord lock is in the shape of a cylinder having rounded ends.

* * * * *